(12) United States Patent
Appel et al.

(10) Patent No.: US 10,987,814 B1
(45) Date of Patent: Apr. 27, 2021

(54) COMPLIANT PERIMETER END EFFECTORS

(71) Applicant: SoftWear Automation Inc., Cumming, GA (US)

(72) Inventors: D. Keith Appel, Atlanta, GA (US); Michael J. Baker, Acworth, GA (US); Luther Lloyd, III, Dallas, GA (US)

(73) Assignee: SoftWear Automation, Inc., Cumming, GA (US)

(*) Notice: Subject to any disclaimer, the term of this patent is extended or adjusted under 35 U.S.C. 154(b) by 0 days.

(21) Appl. No.: 16/889,275

(22) Filed: Jun. 1, 2020

(51) Int. Cl.
| | |
|---|---|
| *B23Q 5/22* | (2006.01) |
| *B65H 5/00* | (2006.01) |
| *B25J 15/00* | (2006.01) |
| *B25J 9/16* | (2006.01) |
| *B25J 18/02* | (2006.01) |

(52) U.S. Cl.
CPC ......... *B25J 15/0033* (2013.01); *B25J 9/1612* (2013.01); *B25J 15/0019* (2013.01); *B25J 18/02* (2013.01)

(58) Field of Classification Search
CPC .. B25J 15/0019; B25J 9/1612; B25J 15/0033; B25J 18/02; B25J 15/0071; B25J 15/12
See application file for complete search history.

(56) References Cited

U.S. PATENT DOCUMENTS

| | | | | |
|---|---|---|---|---|
| 3,433,187 | A * | 3/1969 | Reid | D05B 33/02 112/2 |
| 7,971,542 | B2 * | 7/2011 | Block | D05B 35/102 112/2.1 |
| 2001/0020433 | A1* | 9/2001 | Burton | D05B 23/00 112/470.05 |
| 2008/0169579 | A1* | 7/2008 | Mueller-Hummel | B29C 70/386 264/40.1 |
| 2014/0096421 | A1* | 4/2014 | Lundt | D06F 67/04 38/143 |
| 2018/0080155 | A1* | 3/2018 | Sano | D05B 19/12 |

\* cited by examiner

*Primary Examiner* — Harry Y Oh
(74) *Attorney, Agent, or Firm* — Thomas Horstemeyer, LLP

(57) ABSTRACT

Various examples are provided related to end effectors for use in, e.g., automation of sewing robots. In one example, among others, a compliant perimeter end effector includes a mounting bracket having a contact mounting flange, a plurality of compliant material contact elements coupled about a perimeter of the contact mounting flange. The mounting bracket can couple to a manipulator including, e.g., an industrial robot or other manipulation assembly. The compliant material contact elements can include a contact interface that can engage with a piece of material. The compliant material contact elements can precisely transfer material on a workspace with surface irregularities while equally distributing force to the material.

20 Claims, 8 Drawing Sheets

COMPLIANT PERIMETER END EFFECTORS

BACKGROUND

In automated production of sewn materials, improper handling of the material by robotic end effectors to manipulate materials on a worksurface can result in production of out-of-spec products, which has an immediate economic impact. For example, slip between the material being sewn and the end effector controlling the movement of the material can produce flawed and unacceptable product. Material slip can be especially prevalent for products with non-slip or high friction backings (as is common in mats and rugs) as the end effector must apply substantially more force to the product to move it across a worksurface.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

BRIEF DESCRIPTION OF THE DRAWINGS

The accompanying drawings illustrate various examples of systems, methods, and embodiments of various other aspects of the disclosure. Any person with ordinary skills in the art will appreciate that the illustrated element boundaries (e.g., boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles. Moreover, in the drawings, like reference numerals designate corresponding parts throughout the several views.

DETAILED DESCRIPTION

Figure 1:
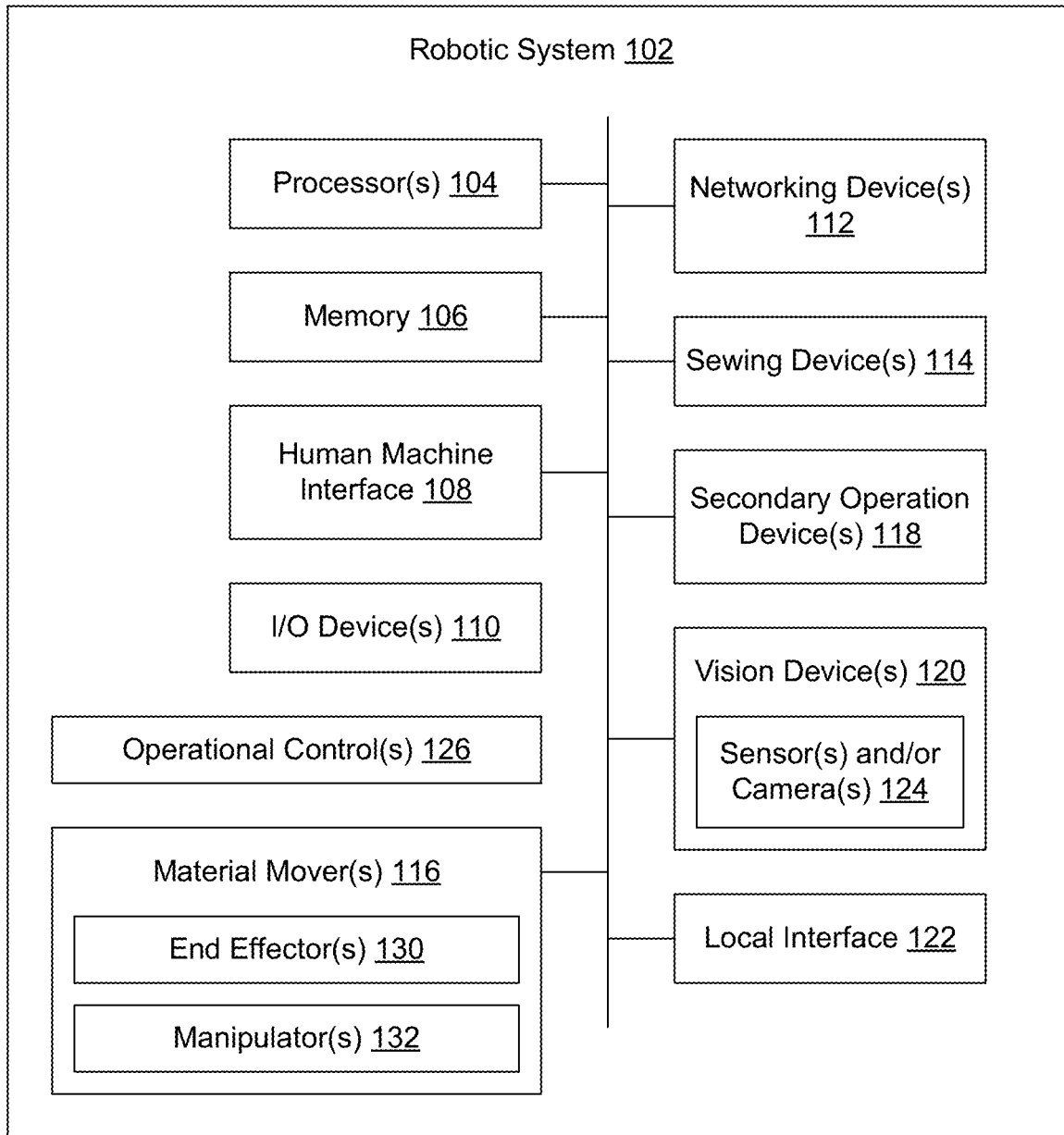
FIG. 1 illustrates an example of a robotic system, according to various embodiments of the present disclosure.

Disclosed herein are various examples related to end effectors for use in, e.g., automation of the production of sewn products. For example, compliant material contact elements can be arranged around a perimeter of the end effector to grip and hold the material during processing. Reference will now be made in detail to the description of the embodiments as illustrated in the drawings, wherein like reference numbers indicate like parts throughout the several views.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred systems and methods are now described.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Referring to FIG. 1, shown is an example of a system that can be used for material manipulation and sewing. As illustrated in the example of FIG. 1, the system can comprise a robotic system 102, which can include a processor 104, memory 106, an interface such as, e.g., a human machine interface (HMI) 108, I/O device(s) 110, networking device(s) 112, a sewing device 114, material mover(s) 116, secondary operation device(s) 118, vision device(s) 120, and a local interface 122. The vision device(s) 120 can comprise one or more sensor and/or camera 124 such as, e.g., an RGB camera, an RGB-D camera, a near infrared (NIR) camera, stereoscopic camera, photometric stereo camera (single camera with multiple illumination options), time of flight camera, IP camera, light-field camera, monorail camera, multiplane camera, rapatronic camera, still camera, thermal imaging camera, acoustic camera, rangefinder camera, etc. The robotic system 102 can also include operational control(s) 126, which can be executed by the robotic system 102 to implement manipulation and/or processing of materials. The material mover(s) 116 can comprise end effector(s) 130 which can be manipulated through one or more manipulator(s) 132 such as, e.g., industrial robot(s) or other manipulator or appropriate manipulation assembly. Industrial robots include, e.g., articulated robots, selective compliance assembly robots (SCARA), delta robots, and cartesian coordinate robots (e.g., gantry robots or x-y-z robots). Industrial robots can be programmed to carry out repetitive actions with a high degree of accuracy or can exhibit more flexibility by utilizing, e.g., machine vision and machine learning.

The robotic system 102 can grip a piece of product material and move it about a work area utilizing the material mover(s) 116. For example, an end effector 130 can be moved by a manipulator 132 to engage with a piece of material and manipulate its position and/or orientation for processing by the robotic system 102. When the desired processing of the material is complete, movement of the end effector 130 can transport the material out of the work area.

The end effector 130 can then be repositioned by the manipulator 132 to engage with another piece of material. The piece of material can then be manipulated for processing by the robotic system 102. This automated motion can be very beneficial in many repetitive processes.

The processor 104 can be configured to decode and execute any instructions received from one or more other electronic devices or servers. The processor can include one or more general-purpose processors (e.g., INTEL® or Advanced Micro Devices® (AMD) microprocessors) and/or one or more special purpose processors (e.g., digital signal processors or Xilinx® System on Chip (SOC) field programmable gate array (FPGA) processor). The processor 104 may be configured to execute one or more computer-readable program instructions, such as program instructions to carry out any of the functions described in this description.

The Memory 106 can include, but is not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions. The Memory 106 can comprise one or more modules (e.g., operational control(s) 126) that can be implemented as a program executable by processor(s) 104.

The interface(s) or HMI 108 can accept inputs from users, provide outputs to the users, or may perform both the actions. In one case, a user can interact with the interface(s) using one or more user-interactive objects and devices. The user-interactive objects and devices may comprise user input buttons, switches, knobs, levers, keys, trackballs, touchpads, cameras, microphones, motion sensors, heat sensors, inertial sensors, touch sensors, visual indications (e.g., indicator lights, meters, or screens), audio indications (e.g., bells, buzzers, etc.) or a combination of the above. Further, the interface(s) can either be implemented as a command line interface (CLI), a graphical user interface (GUI), a voice interface, or a web-based user-interface, at element 108. The interface(s) can also include combinations of physical and/or electronic interfaces, which can be designed based upon the environmental setting or application.

The input/output devices or I/O devices 110 of the robotic system 102 can comprise components used to facilitate connections of the processor 104 to other devices such as, e.g., sewing device 114, material mover(s) 116, secondary operation device(s) 118 and/or vision device(s) 120 and can comprise one or more serial, parallel, small system interface (SCSI), universal serial bus (USB), IEEE 1394 (i.e. Firewire™) connection elements or other appropriate connection elements.

The networking device(s) 112 of the robotic system 102 can comprise the various components used to transmit and/or receive data over a network. The networking device(s) 112 can include a device that can communicate both inputs and outputs, for instance, a modulator/demodulator (i.e. modem), a radio frequency (RF) or infrared (IR) transceiver, a telephonic interface, a bridge, a router, as well as a network card, etc.

The sewing device 114 of the robotic system 102 facilitates sewing the product materials together and can be configured to sew a perimeter, along markings on the product material, or other paths based on tracking a generated pattern. In additional embodiments, the sewing device 114 can include a knife device in order to cut threads, stitches, materials from the workpiece, etc. The material mover(s) 116 of the robotic system 102 can facilitate moving the product material(s) during the cutting and sewing operations, at element 116. The secondary operation device(s) 118 can include stacking device(s), folding device(s), label manipulation device(s), and/or other device(s) that assist with the preparation, making and/or finishing of the sewn product.

The vision device(s) 120 of the robotic system 102 can facilitate detecting the movement of the product material(s) and inspecting the product material(s) for defects and/or discrepancies before, during of after a sewing and cutting operation or other process operation. Further, the vision device(s) 120 can facilitate detecting markings on the product before cutting or sewing the material. A vision device 120 can comprise, but is not limited to, an RBG camera, RGB-D camera, near IR camera, time of flight camera, Internet protocol (IP) camera, light-field camera, monorail camera, multiplane camera, rapatronic camera, stereo camera, still camera, thermal imaging camera, acoustic camera, rangefinder camera, etc., at element 120. The RGB-D camera is a digital camera that can provide color (RGB) and depth information for pixels in an image.

The local interface 122 of the robotic system 102 can be, for example, but not limited to, one or more buses or other wired or wireless connections, as is known in the art. The local interface 122 can have additional elements, which are omitted for simplicity, such as controllers, buffers (caches), drivers, repeaters, and receivers, to enable communications. Further, the local interface 122 can include address, control, and/or data connections to enable appropriate communications among the components, at element 122.

As shown in FIG. 1, the robotic system 102 includes operational control(s) 126 which can control the robotic system 102 and material mover(s) 116, as will be discussed. The operational control(s) 126 can include one or more process modules that can be executed in order to control operation of various components of the robotic system 102. For example, a manipulator 132 (e.g., industrial robot or other manipulation assembly) can be used to manipulate an end effector 130 for moving a piece of material about a worksurface.

Figure 2A:
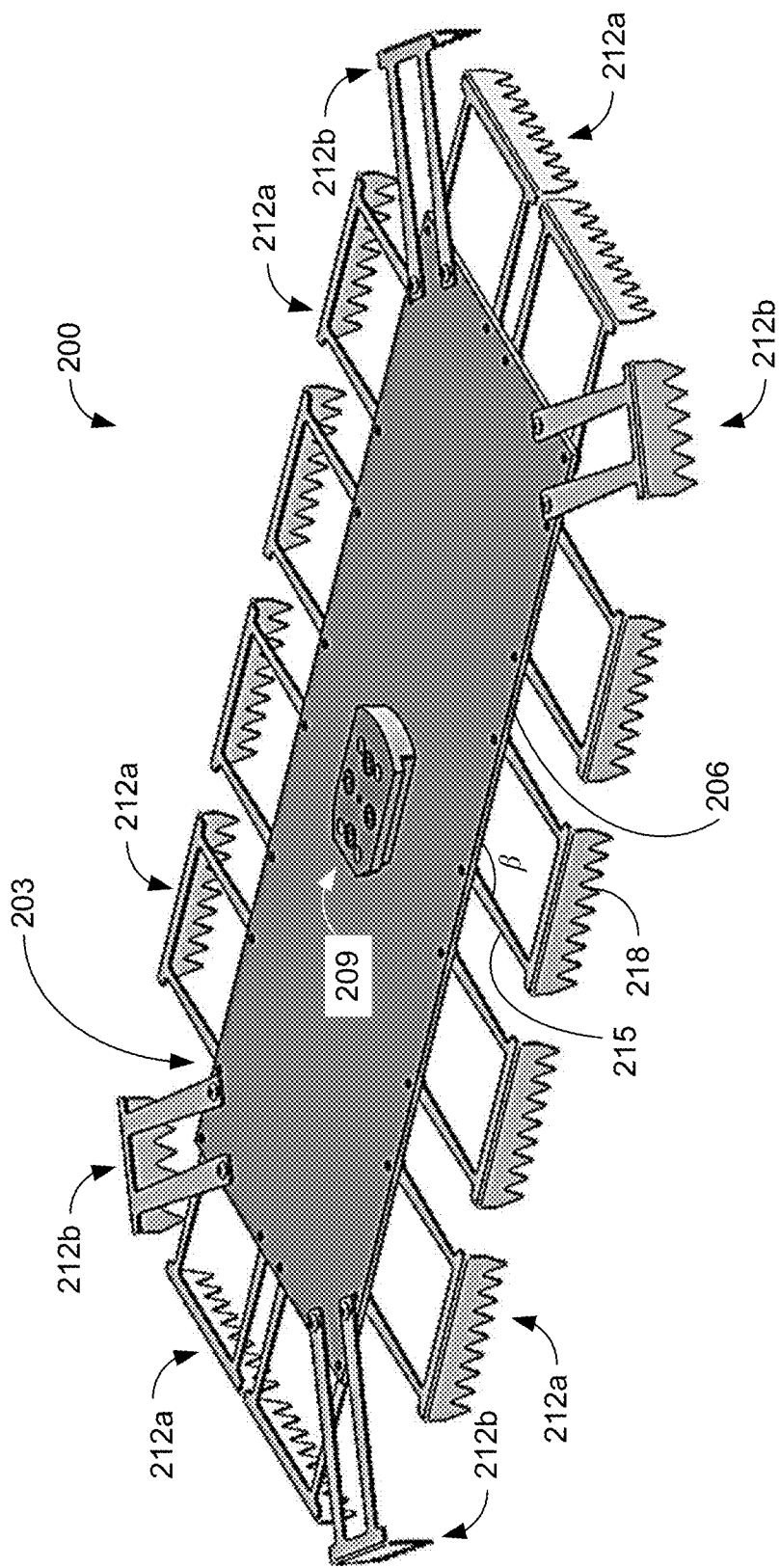
FIG. 2A illustrates an example of a compliant perimeter end effector, according to various embodiments of the present disclosure.

Referring now to FIG. 2A, shown is an example of a compliant perimeter end effector 200 that can be used for manipulation of materials on a worksurface of the robotic system 102. The compliant perimeter end effector 200 comprises a mounting bracket 203 including a contact mounting flange 206 which can be attached to a connector 209 that allows the end effector 200 to be coupled to a manipulator 132 (e.g., an industrial robot). The connector 209 can be, e.g., a releasable connector (e.g., a quick release blade connection, threaded connection, lever or dial connection, or other type of quick disconnect) configured to detachably connect to an end of the manipulator 132. The connector 209 can be configured to allow for automated changeout of the end effector 200 by, e.g., an automated tool changer. For example, a selection of end effectors 200 can be positioned on a rotating carousel which can facilitate removal of an end effector 200 attached to the manipulator 132 and attachment of another end effector 200 either pneumatically or otherwise.

The connector 209 can be attached to the contact mounting flange 206 by screws, bolts, rivets, or other appropriate fasteners. For example, the fastener can pass through the flange and engage with the connector 209 or pass through the connector and engage with the contact mounting flange 206. In other implementations, the connector 209 can be bonded to (e.g., welded, glued, etc.) or integrally formed with the contact mounting flange 206. In some embodiments, the mounting flange can be attached directly to the manipulator 132 by screws, bolts, or other appropriate fasteners or through a threaded connection in the contact mounting flange 209 without including a connector 209.

As shown in FIG. 2A, the contact mounting flange 206 can comprise a substantially planar plate (or other structure) for mounting compliant material contact elements 212 to the contact mounting flange 206. In the example of FIG. 2A, the contact mounting flange 206 is illustrated as a solid plate such as, e.g., a sheet of steel, aluminum, or other appropriate material. In other implementations, the contact mounting flange 206 can include openings extending through the flange to reduce the weight of the end effector and/or allow for added flexibility of the contact mounting flange 206. The openings can be arranged in size, shape and orientation to provide a desired flexibility to the compliant perimeter end effector 200. In some embodiments, the contact mounting flange 206 can include ribs or fins that extend across the length or width of the mounting flange, or that radially extend from the connector 209 to provide added stiffness or strength to the contact mounting flange 206.

A plurality of compliant material contact elements 212 configured to engage with a piece of material can be mounted around a perimeter of the contact mounting flange 206. The compliant material contact elements 212 provide spring like members that allow the applied force (or load) to be more evenly distributed around the perimeter of the piece of material. The shape of the contact mounting flange 206 and the arrangement of the contact elements 212 can vary depending upon the application and material being handled by the end effector 200. For example, while the shape of the contact mounting flange 206 illustrated in FIG. 2A is rectangular, other geometric shapes (e.g., circular, square, hexagonal, octagonal, etc.) or other specialized designs can be utilized to facilitate appropriate positioning of the compliant material contact elements 212. The distribution and placement of the contact elements 212 around the contact mounting flange 206 can be varied to ensure the appropriate contact with the piece of material to facilitate movement and processing by the robotic system 102 (FIG. 1). As can be seen in FIG. 2A, the compliant material contact elements 212 can be non-uniformly positioned (or spaced) around the contact mounting flange 206 or can be uniformly distributed about the mounting flange (see, e.g., FIG. 3A). The compliant material contact elements 212 can extend from the contact mounting flange 206 at the same angle (e.g., substantially perpendicular to the edge of the mounting flange 206) or can extend at different angles ($\beta$) with respect to the edge of the mounting flange (as illustrated in FIG. 2A). The positioning of the contact elements 212 can be based on the design of the material being manipulated by the end effector 200.

Figure 2B:
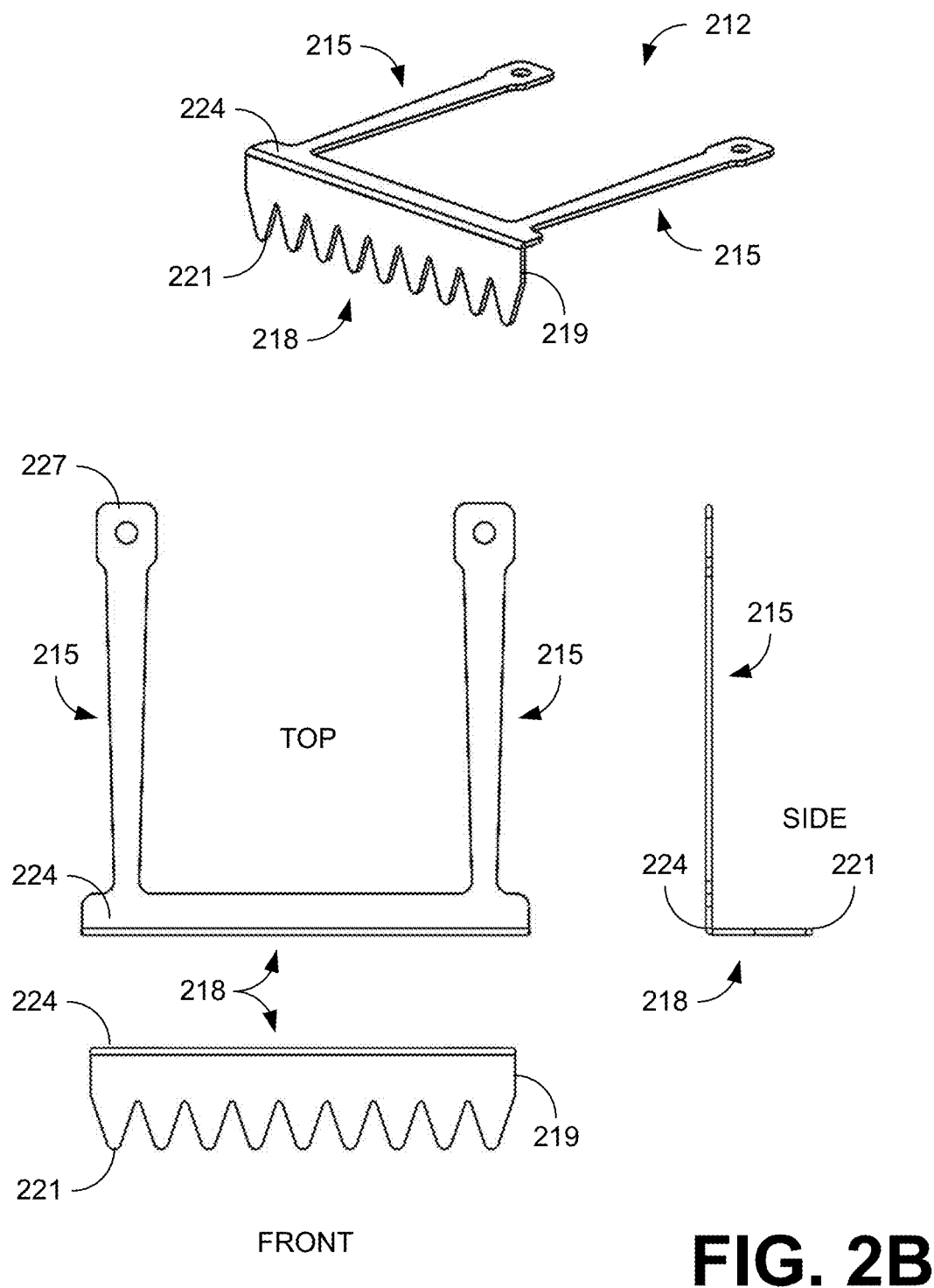
FIGS. 2B-2F illustrate examples of compliant material contact elements of the compliant perimeter end effector of FIG. 2A, according to various embodiments of the present disclosure.

FIG. 2B provides perspective, top, side and front views of an embodiment of the compliant material contact elements 212. Individual compliant material contact elements 212 can include one or more flexure arms 215 that extend between the contact mounting flange 206 and a gripping unit 218 configured to engage with the piece of material through a contact interface. For example, the gripping unit 218 can comprise a contact plate 219 with a contact interface 221 that engages with the piece of material. The contact interface 221 can be an edge (or side) of the contact plate 219. The flexure arms 215 can extend from a spine (or shoulder) 224 opposite the contact interface 221. The contact interface 221 can include teeth or serrations that can penetrate through a portion of the material (e.g., the pile of a rug) for better gripping of the material. Various tooth profiles such as triangular, rectangular, rounded or circular may be utilized. A simple triangular tooth profile can work well to balance the number of contact points, bending stiffness, and clearance depth for materials with thicker piles such as rugs. A consistent spacing between the teeth (e.g., about 10 mm) allows for a more consistent force on each tooth of the gripper unit 218. In other embodiments, the gripping unit 218 can include a contact pad that engages with the material. Contact can be made along an edge of the contact pad or on a planar (or substantially planar) surface of the contact pad.

In other embodiments of compliant material contact elements 212, compliance can be achieved with the assistance of a spring, as opposed to relying on the flexure of the flexure arms 215. In these embodiments, the flexure arms can be hinged, with spring elements applying a force to impart rotation about that hinge. Alternately, the gripping unit 218 could be spring loaded directly (e.g., straight down). In these embodiments, the gripping unit can comprise one or more spring-loaded pin(s) that contact the piece of material.

In the example of FIG. 2A, the compliant material contact elements 212 include two flexure arms 215 that are attached adjacent to opposite ends of the gripping unit 218. The flexure arms 215 can extend substantially perpendicular to a side of the gripping unit 218. The arrangement of the flexure arms 215 can be varied to achieve a desired contact force on the material. For example, the flexure arms 215 can taper from a first end to a second end as shown in FIG. 2B, which can assist in the distribution of stress along the flexure arms 215. In some implementations, a mounting pad 227 can be included at the end of the flexure arm 215 opposite the gripping unit 218. Screws, bolts, rivets or other appropriate fasteners can be used to connect the flexure arms 215 to the contact mounting flange 206.

By having a plurality of compliant material contact elements 212 distributed around the contact mounting flange 206, the compliant material contact elements 212 can independently move (e.g., deflect, bend, or twist), which can avoid pinching of the material between the worksurface and the end effector due to surface variations. For instance, the independent deflection of the compliant material contact elements 212 can compensate for height variations that may be present in the worksurface or material. In the example of FIG. 2A, two types of compliant material contact elements 212 with different configurations are utilized. The first elements 212a extend from the edges of the contact mounting flange 206 and the second elements 212b extend from the corners of the contact mounting flange 206. As seen in FIG. 2A, the first elements 212a have wider gripping units 218 (e.g., about 90 mm) and narrower flexure arms 215. The second elements 212b have narrower gripping units 218 (e.g., about 60 mm) and wider flexure arms 215, which can account for the longer extension of these flexure arms 215. This arrangement can help evenly distribute the force (or load) around the perimeter of the piece of material.

Stiffness of the flexure arms 215 can also be varied between the individual compliant material contact elements 212 around the contact mounting flange 206. For example, the width or thickness of the flexure arms 215 can be varied to adjust the stiffness of the compliant material contact elements 212 at different locations. In some embodiments, the flexure arms 215 can include composite materials or combinations of materials that can provide a desired deflection profile. For example, distributions of carbon fibers can be used to provide the desired deflection characteristics. The flexure arms 215 can also comprise layers of different materials to achieve specific tension and/or compression characteristics. Shims (or strips) can also be added onto the flexure arms 215 of a compliant material contact element 212 to increase the stiffness. Different types of flexure arms 215 can be used at different locations across the contact element 212 to provide a varying contact force across the contact interface 221.

Figure 2C:
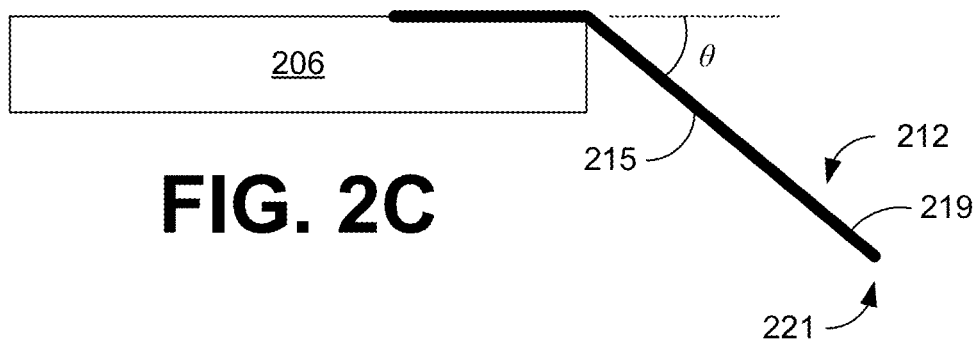
Figure 2D:
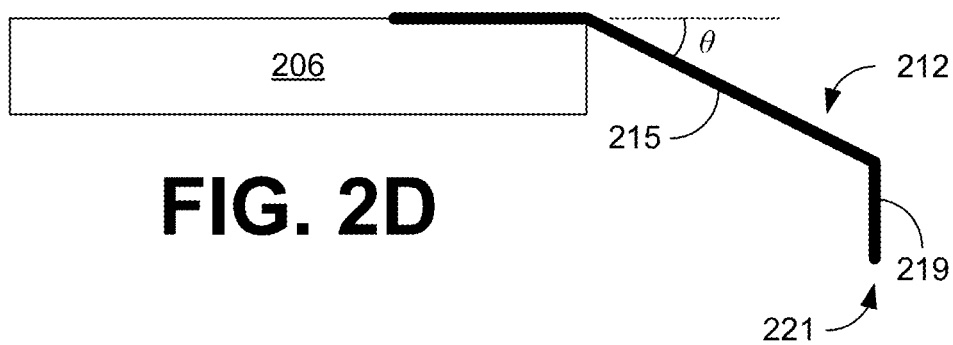

As illustrated in FIGS. 2C-2F, the arrangement of the compliant material contact elements 212 and their connection to the contact mounting flange 206 can be varied. While the flexure arms 215 are substantially perpendicular to the contact plate 219 of the contact element 212 in FIG. 2B, the flexure arms 215 can be extended at different angles (θ) as illustrated in FIGS. 2C and 2D. In the example of FIG. 2C, the flexure arms 215 extend substantially parallel to the contact plate 219 of the contact element 212 and at an angle (θ less than 90 degrees) with respect to the contact mounting flange 206. In this orientation, the contact interface 221 engages with the piece of material at an angle (e.g., in a range from about 15 degrees to about 75 degrees or about 30 degrees to about 60 degrees) instead of substantially perpendicular to the material on the worksurface as in FIG. 2B. In the example of FIG. 2D, the flexure arms 215 extend at an angle with respect to the contact plate 219 of the contact element 212 and at a corresponding angle with respect to the contact mounting flange 206. In this orientation, the contact plate 219 is substantially perpendicular when the contact interface 221 engages with the piece of material on the worksurface.

Figure 2E:
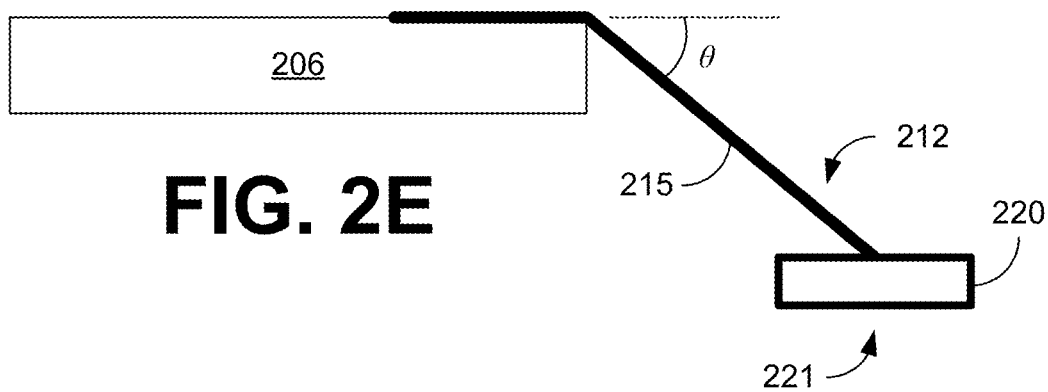

FIG. 2E illustrates an example of a compliant material contact element 212 with a contact pad 220, with one surface acting as the contact interface 221. The flexure arms 215 can extend from a backing plate affixed to the contact pad 220 opposite the contact interface 221. As in the example of FIG. 2D, the flexure arms 215 extend at an angle with respect to the contact pad of the contact element 212 and at a corresponding angle with respect to the contact mounting flange 206. In FIG. 2E, the contact pad 220 is oriented so that the surface of the contact interface 221 is substantially parallel to the material on the worksurface. In other embodiments, the contact pad 220 can be oriented to contact the material on the worksurface at an angle.

Figure 2F:
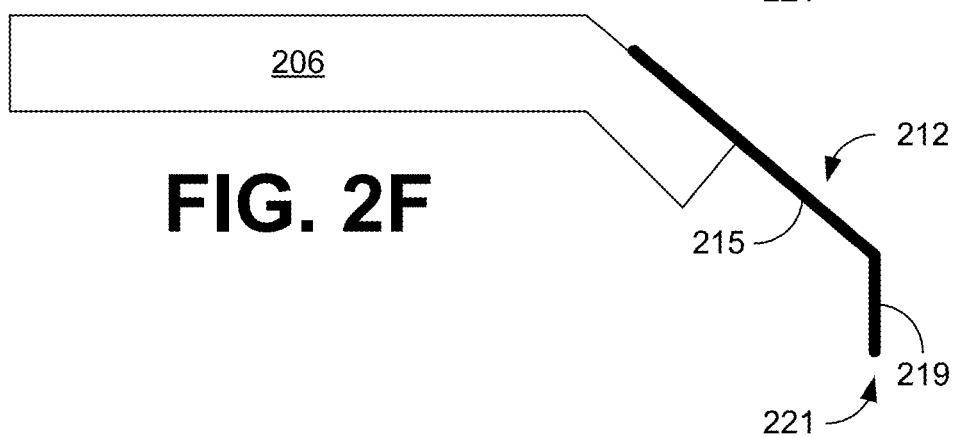

FIG. 2F illustrates an example of a compliant material contact element 212 coupled to an angled surface of the contact mounting flange 206. In this example, the flexure arms 215 extend at an angle with respect to the contact plate 219 of the contact element 212 and are connected to the angled surface of the contact mounting flange 206. In this orientation, the contact plate 219 is substantially perpendicular when the contact interface 221 engages with the piece of material on the worksurface. This can also be utilized with a contact pad 220 as illustrated in FIG. 2E. As can be understood, other orientations or combination of orientations can be utilized in the compliant material contact elements 212.

Figure 3A:
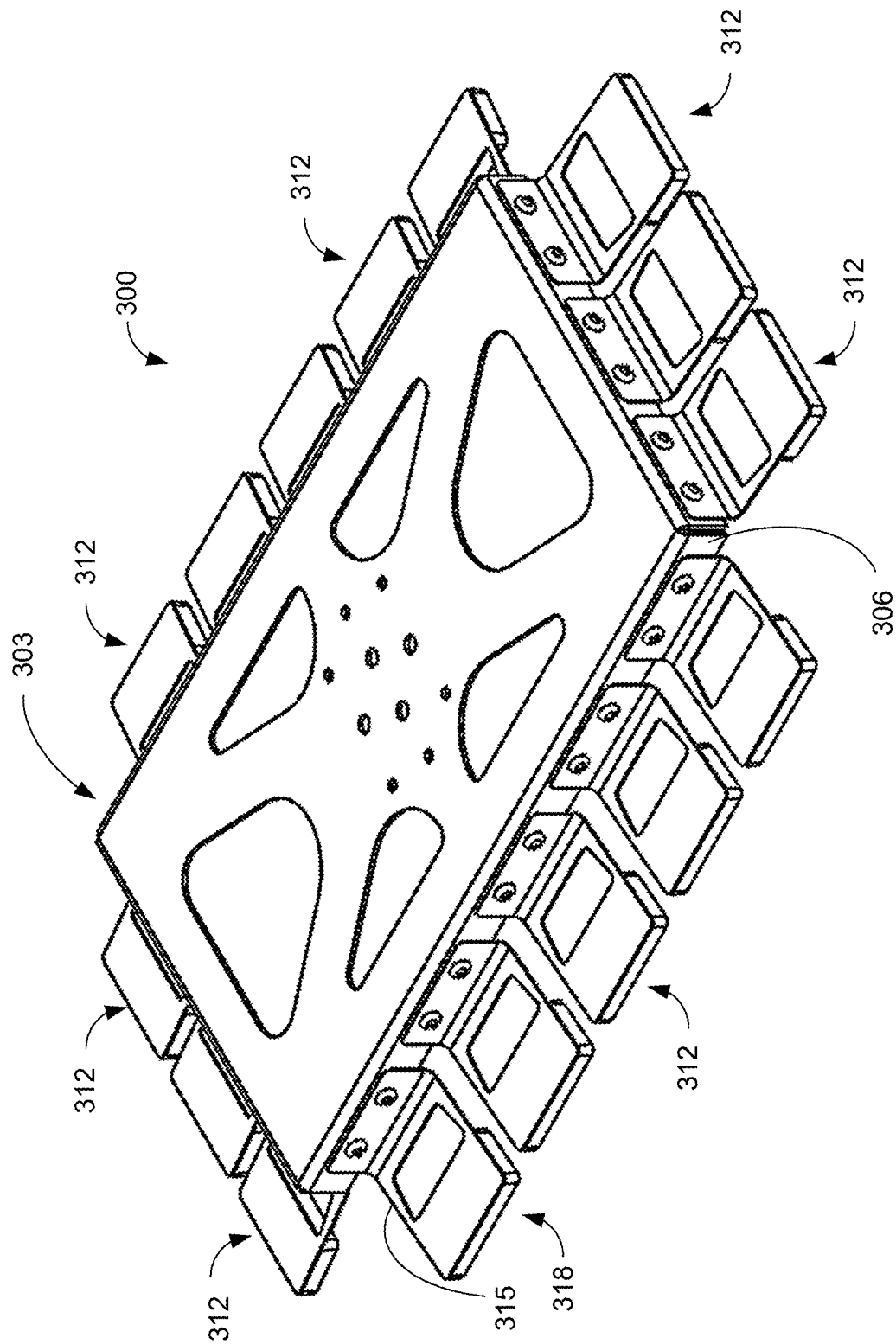
FIGS. 3A and 3B illustrate another example of a compliant perimeter end effector, according to various embodiments of the present disclosure.
Figure 3B:
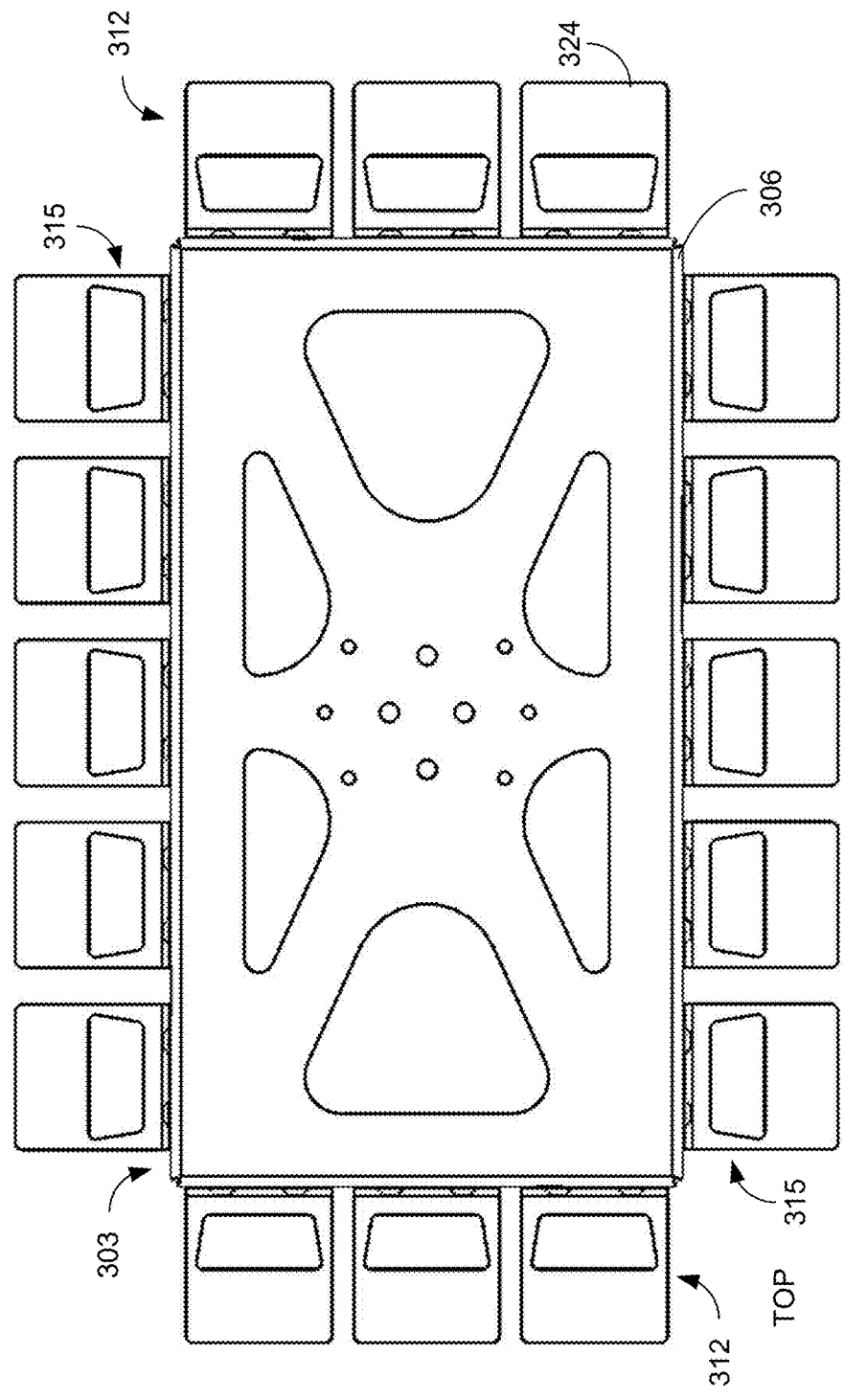
Figure 3B:
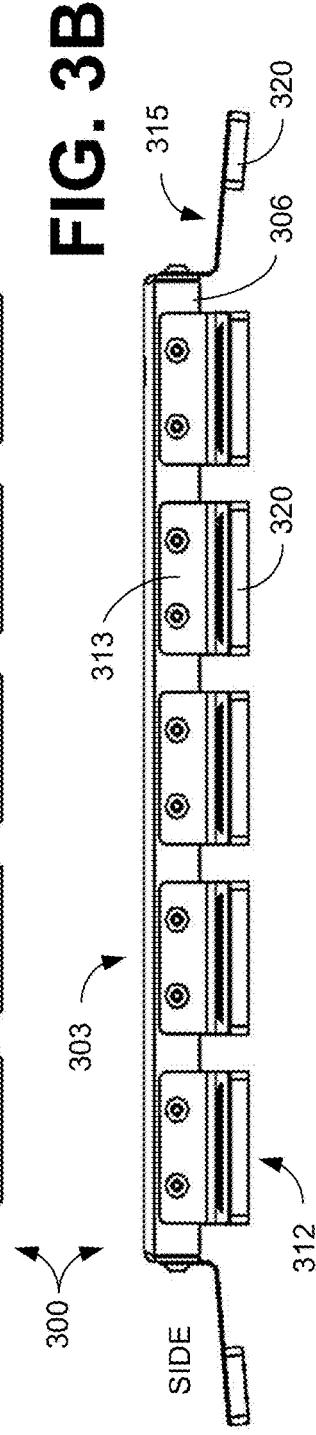

Referring now to FIGS. 3A and 3B, shown are perspective, top and side views of another example of a compliant perimeter end effector 300 that can be used for manipulation of materials on a worksurface of the robotic system 102. The compliant perimeter end effector 300 comprises a mounting bracket 303 including a contact mounting flange 306 which can be attached to a connector (see, e.g., connector 209 of FIG. 2A) that allows the end effector 300 to be coupled to a manipulator 132 (e.g., an industrial robot). The connector can be, e.g., a releasable connector (e.g., a quick release blade connection) configured to detachably connect to an end of the manipulator 132. The connector can be attached to the contact mounting flange 306 by screws, bolts, rivets, or other appropriate fasteners that can extend through mounting holes in the contact mounting flange 306. In other implementations, the connector can be integrally formed with the contact mounting flange 306.

As shown in FIGS. 3A and 3B, the contact mounting flange 306 can comprise a substantially planar plate with edges (or sides) bent substantially perpendicular to the substantially planar plate surface for mounting compliant material contact elements 312 of the contact mounting flange 306. In the example of FIGS. 3A and 3B, the contact mounting flange 306 is illustrated as a plate such as, e.g., a sheet of steel, aluminum, or other appropriate material with the edges (or sides) extending downward away from the upper surface of the plate. In other implementations, the edges (or sides) can extend upward away from the lower surface of the plate. The contact mounting flange 306 can include openings extending through the flange to reduce the weight of the end effector and/or allow for added flexibility of the contact mounting flange 306. The openings can be arranged in size, shape and orientation to provide a desired flexibility to the compliant perimeter end effector 300. In FIGS. 3A and 3B, the openings are arranged to provide support arms that extend to the corners and the sides of the design. In some embodiments, the contact mounting flange 306 can include ribs or fins that extend across the length or width of the mounting flange, or along the support arms, to provide added stiffness or strength to the contact mounting flange 306.

Figure 3C:
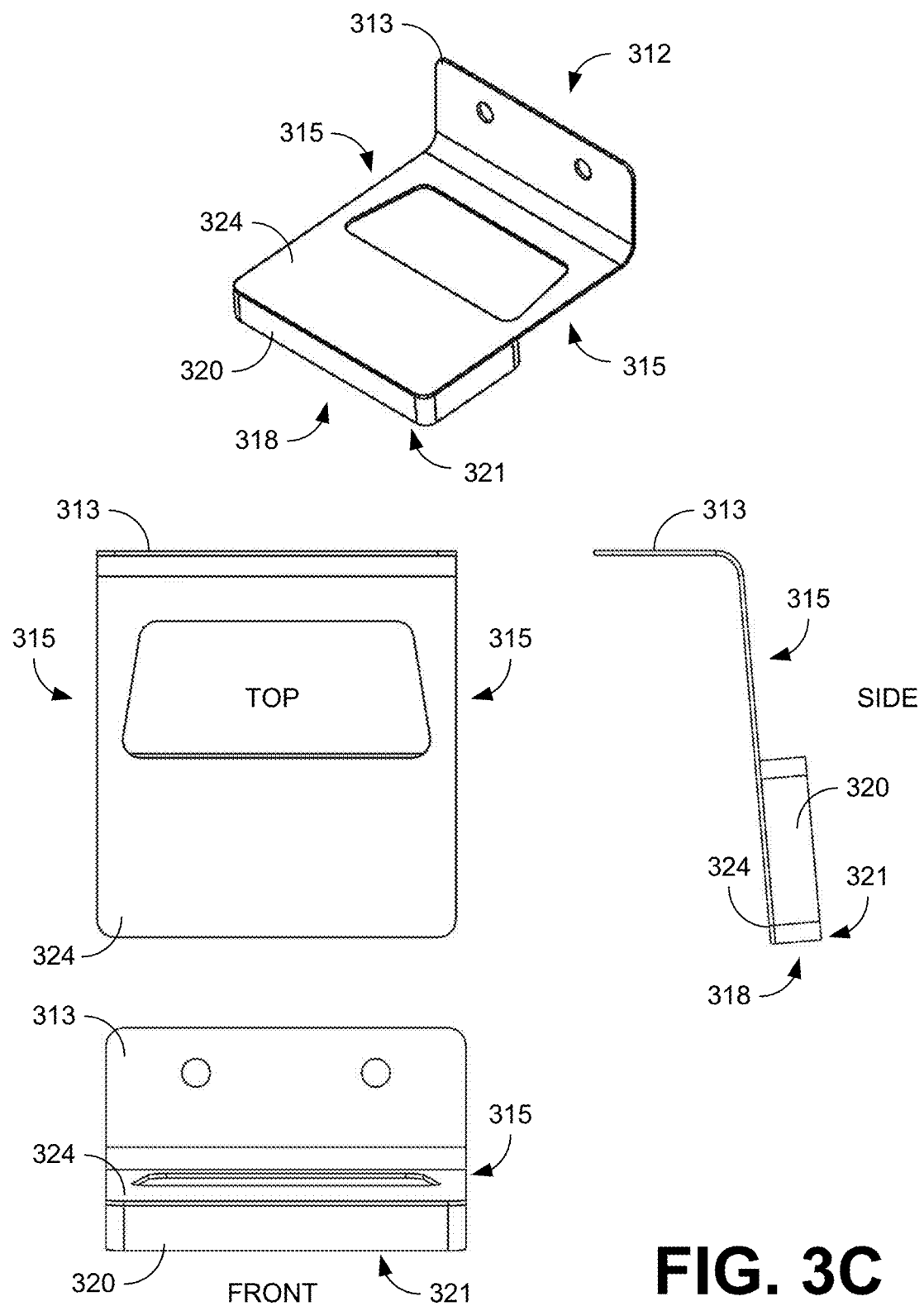
FIGS. 3C-3G illustrate examples of compliant material contact elements of the compliant perimeter end effector of FIGS. 3A and 3B, according to various embodiments of the present disclosure.

A plurality of compliant material contact elements 312 configured to engage with a piece of material can be mounted around a perimeter of the contact mounting flange 306. The compliant material contact elements 312 provide spring like members that allow the applied force (or load) to be more evenly distributed around the perimeter of the piece of material. FIG. 3C provides perspective, top, side and front views of an embodiment of the compliant material contact elements 312. Individual compliant material contact elements 312 can include one or more flexure arms 315 that extend between a mounting plate 313, which can be coupled or affixed to the contact mounting flange 306, and a gripping unit 318 configured to engage with the piece of material through a contact interface. For example, the gripping unit 318 can comprise a contact pad 320 with a contact interface 321 that engages with the piece of material. The flexure arms 315 can extend from a backing plate 324 affixed to the contact pad 320 opposite the contact interface 321. The contact pad 320 can comprise a pad material that engages with a surface of the piece of material for better gripping. For example, the pad material can have a friction with the piece of material that is about twice or more than the friction of the piece of material with the worksurface.

The contact interface 321 can be smooth as illustrated in FIG. 3C or can be textured or made of a higher friction material to facilitate gripping of the material, and a variety of shapes such as triangular, rectangular, rounded or circular may be utilized. As illustrated in FIGS. 3B and 3C, the gripping unit 318 can be secured at an angle so that an outer edge of the contact pad 320 first contacts the material. As downward pressure is applied, the flexure arms 314 bend upward to apply additional force to the material. The contact pad 320 can be split into sections or partially split to enhance compliance or flexibility when engaged with the piece of material. In other embodiments, the gripping unit 318 can include a contact plate 219 with a contact interface 221 that engages with the piece of material. Contact can be made along a contact interface of the contact plate 219, which can include teeth or serrations for better gripping of the material. Various tooth profiles such as triangular, rectangular, rounded or circular may be utilized as discussed with respect to FIG. 2B.

In the example of FIGS. 3A-3C, the compliant material contact elements 312 include two flexure arms 315 that are attached adjacent to the mounting plate 313 at opposite ends (or sides) of the gripping unit 318. The flexure arms 315 can extend substantially perpendicular to a side of the gripping unit 318. The arrangement of the flexure arms 315 can be varied to achieve a desired contact force on the material. For example, the flexure arms 315 can taper from a first end to a second end as shown in FIGS. 3B and 3C, which can assist in the distribution of stress along the flexure arms 315. In some implementations, mounting pads can be included at the end of the flexure arms 315 opposite the gripping unit 318 instead of the mounting plate 313. Screws, bolts, rivets or other appropriate fasteners can be used to connect the mounting plate 313 (or the flexure arms 315) to the edges (or sides) of the contact mounting flange 306.

By having a plurality of compliant material contact elements 312 distributed around the contact mounting flange 306, the compliant material contact elements 312 can independently move (e.g., deflect, bend, or twist). This motion or flexibility can allow the contact interface of the end effector to better conform with any surface height variations in the workpiece or the worksurface, reducing the variation of force applied by the end effector to the workpiece at any given point. More consistent force application can prevent the loss of grip by the end effector in relative low areas of the workpiece or worksurface, and excessive force or damage to the workpiece in relative high areas of the workpiece or worksurface. In the example of FIGS. 3A and 3B, one type of compliant material contact elements 312 is utilized. The compliant material contact elements 312 are shown uniformly distributed about the contact mounting flange 306. In some embodiments, the size of the compliant material contact elements 312 can be varied.

Stiffness of the flexure arms 315 can also be varied between the individual compliant material contact elements 312 around the contact mounting flange 306. For example, the width or thickness of the flexure arms 315 can be varied to adjust the stiffness of the compliant material contact elements 312 at different locations. In some embodiments, the flexure arms 315 can include composite materials or combinations of materials that can provide a desired deflection profile. For example, distributions of carbon fibers can be used to provide the desired deflection characteristics. The flexure arms 315 can also comprise layers of different materials to achieve specific tension and/or compression characteristics. Shims (or strips) can also be added onto the flexure arms 315 of a compliant material contact element 312 to increase the stiffness. Different types of flexure arms 315 can be used at different locations across the contact element 312 to provide a varying contact force across the contact interface 321.

Figure 3D:
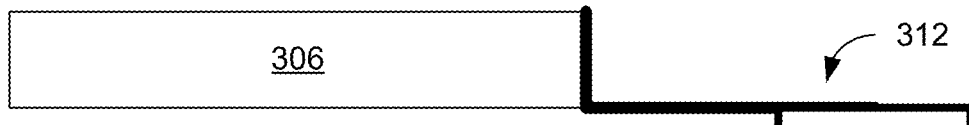

As illustrated in FIGS. 3D-3G, the arrangement of the compliant material contact elements 312 and their connection to the contact mounting flange 306 can be varied. While the flexure arms 315 extend at a downward angle to the contact pad 320 of the contact element 312 in FIGS. 3B and 3C, the flexure arms 315 can be extended substantially parallel with the contact mounting flange 306 as illustrated in FIG. 3D. In the example of FIG. 3D, the flexure arms 315 extend substantially parallel to the contact pad 320 of the contact element 312. In this orientation, the contact interface 321 engages with the piece of material across the surface of the contact pad 320.

Figure 3E:
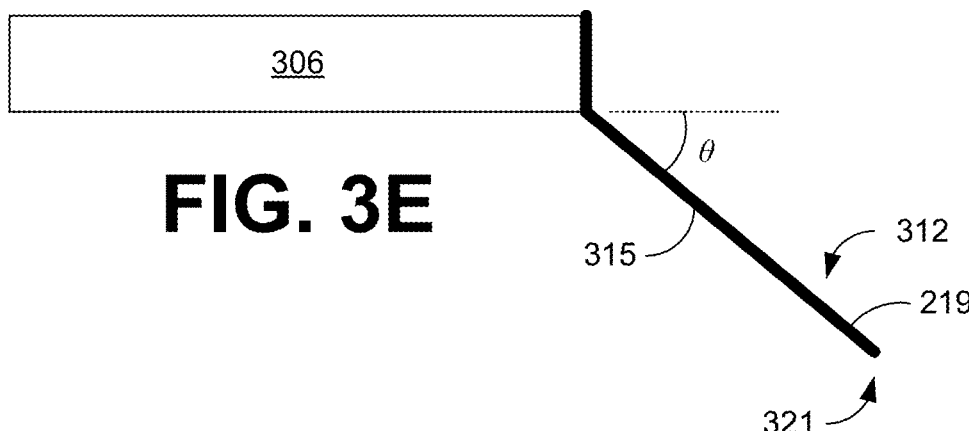
Figure 3F:
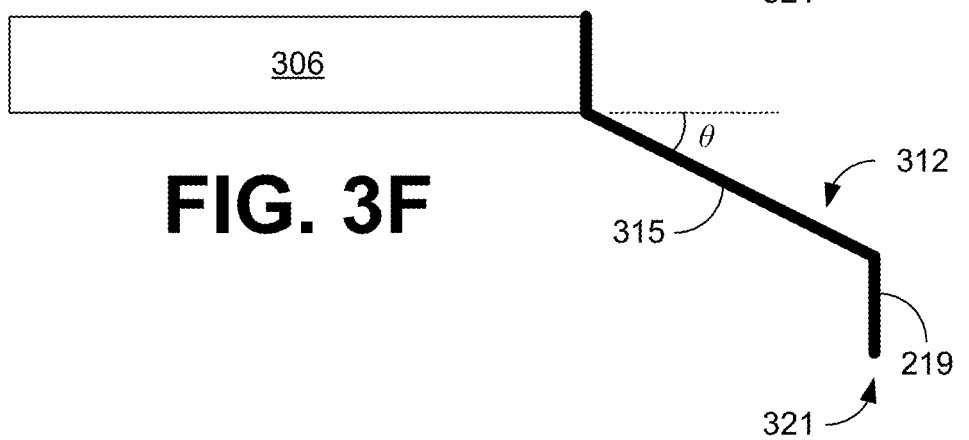

In other embodiments, the gripping unit 318 can include a contact plate 219 with a contact interface 221 that engages with the piece of material as described with respect to FIGS. 2A-2D. In the example of FIG. 3E, the flexure arms 315 extend substantially parallel to the contact plate 219 of the contact element 312 and at an angle (less than 90 degrees) with respect to the contact mounting flange 306. In this orientation, the contact interface 321 engages with the piece of material at an angle (e.g., in a range from about 15 degrees to about 75 degrees or about 30 degrees to about 60 degrees) instead of substantially perpendicular to the material on the worksurface. In the example of FIG. 3F, the flexure arms 315 extend at an angle with respect to the contact plate 219 of the contact element 312 and at a corresponding angle with respect to the contact mounting flange 306. In this orientation, the contact plate 219 is substantially perpendicular when the contact interface 321 engages with the piece of material on the worksurface.

Figure 3G:
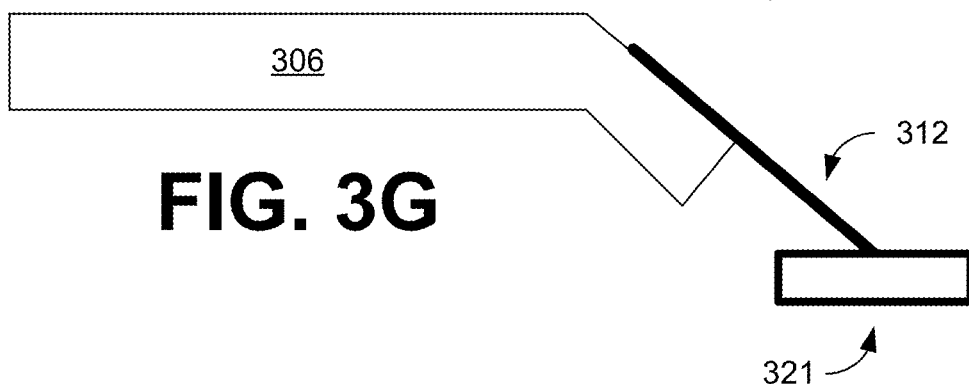

FIG. 3G illustrates an example of a compliant material contact element 312 coupled to an angled surface of the contact mounting flange 306. In this example, the flexure arms 315 extend at an angle with respect to the contact pad 320 of the contact element 312 and are connected to the angled surface of the contact mounting flange 306. In this orientation, the contact pad 320 is substantially parallel when the contact interface 321 engages with the piece of material on the worksurface. As can be understood, other orientations or combination of orientations can be utilized in the compliant material contact elements 312.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A compliant perimeter end effector, comprising:
   a mounting bracket having a contact mounting flange, the mounting bracket configured to couple to a manipulator; and
   a plurality of compliant material contact elements comprising individual contact elements coupled about a perimeter of the contact mounting flange, wherein each of the individual contact elements comprises:
      a gripping unit having a contact interface configured to engage with a piece of material; and
      at least one flexure arm extending between the gripping unit and the perimeter of the contact mounting flange.

2. The compliant perimeter end effector of claim 1, wherein the individual contact elements comprise at least two flexure arms.

3. The compliant perimeter end effector of claim 2, wherein a first flexure arm is attached to a first end of the gripping unit and a second flexure arm is attached to a second end of the gripping unit.

4. The compliant perimeter end effector of claim 3, wherein the individual contact elements of the plurality of compliant material contact elements comprise a mounting plate extending between the first and second flexure arms opposite the gripping unit, wherein the mounting plate is coupled to the perimeter of the contact mounting flange.

5. The compliant perimeter end effector of claim 4, wherein the mounting plate comprises a first portion that is substantially parallel with the first and second flexure arms, and a second portion extending at an angle with respect to the first and second flexure arms.

6. The compliant perimeter end effector of claim of claim 5, wherein the angle is in a range from about 90 degrees to about 110 degrees.

7. The compliant perimeter end effector of claim 1, wherein a width of the at least one flexure arm tapers from a proximal end coupled to the contact mounting flange to a distal end attached to the gripping unit.

8. The compliant perimeter end effector of claim 1, wherein the gripping unit comprises a contact plate comprising the contact interface, the contact plate attached to the at least one flexure arm.

9. The compliant perimeter end effector of claim of claim 8, wherein the at least one flexure arm extends substantially perpendicular to the contact plate.

10. The compliant perimeter end effector of claim 9, wherein the contact plate extends between first and second flexure arms.

11. The compliant perimeter end effector of claim 8, wherein the contact interface comprises teeth or serrations extending across the contact plate.

12. The compliant perimeter end effector of claim 11, wherein the tips of the teeth are rounded.

13. The compliant perimeter end effector of claim 1, wherein the gripping unit comprises a contact pad comprising the contact interface, the contact pad attached to a backing plate attached to the at least one flexure arm.

14. The compliant perimeter end effector of claim 13, wherein the contact pad comprises a substantially planar contact interface.

15. The compliant perimeter end effector of claim 13, wherein the contact interface comprises an edge of the contact pad.

16. The compliant perimeter end effector of claim 1, wherein the contact mounting flange comprises a substantially planar surface.

17. The compliant perimeter end effector of claim 16, wherein the at least one flexure arm is substantially parallel with the substantially planar surface.

18. The compliant perimeter end effector of claim 16, wherein the contact mounting flange comprises edges bent substantially perpendicular to the substantially planar surface.

19. The compliant perimeter end effector of claim 18, wherein the at least one flexure arm is coupled to at least one of the edges via a mounting plate.

20. The compliant perimeter end effector of claim 16, wherein the substantially planar surface comprises openings extending through the contact mounting flange.

* * * * *